United States Patent [19]

Cole

[11] Patent Number: 5,058,106

[45] Date of Patent: * Oct. 15, 1991

[54] FLYWHEEL CIRCUIT

[75] Inventor: Gary B. Cole, Knightdale, N.C.

[73] Assignee: Alcatel NA Network Systems Corp., Raleigh, N.C.

[ * ] Notice: The portion of the term of this patent subsequent to Feb. 12, 2008 has been disclaimed.

[21] Appl. No.: 451,414

[22] Filed: Dec. 15, 1989

[51] Int. Cl.$^5$ ................................................ H04J 3/06
[52] U.S. Cl. ................................ 370/47; 370/100.1; 370/105.1; 375/106
[58] Field of Search ........................ 370/47, 100.1, 103, 370/105.1, 105.4, 105.5; 375/106, 111, 113, 118, 119, 108

[56] References Cited

U.S. PATENT DOCUMENTS

| | | | |
|---|---|---|---|
| 3,271,688 | 9/1966 | Gschwind et al. | 370/47 |
| 4,156,112 | 5/1979 | Moreland | 370/105.1 |
| 4,282,600 | 8/1981 | Zemanek | 370/47 |
| 4,340,962 | 7/1982 | Wintzer et al. | 370/105.4 |
| 4,712,211 | 12/1987 | Suzuki et al. | 370/105.4 |
| 4,876,683 | 10/1989 | Suzuki | 370/105.1 |

*Primary Examiner*—Douglas W. Olms
*Assistant Examiner*—Alpus H. Hsu
*Attorney, Agent, or Firm*—Peter C. Van Der Sluys

[57] ABSTRACT

A system that provides a signal in an assigned time slot of a multi-time slot repetitive frame, the assigned time slot being determined by input data that changes only on occasion, includes a flywheel circuit for reducing the chance that intermittent errors in the data input may cause the signal to be provided in an incorrect time slot. The flywheel circuit includes a time slot counter synchronized to provide a zero count during the assigned time slot and to initiate an output signal whenever the zero count occurs. The timing of a particular count of the counter is compared to the timing of the signal from the system during each frame, and if the timing does not correspond in a predetermined manner for a predetermined number of consecutive frames, the counter is re-synchronized to the timing of the signal from the system.

17 Claims, 1 Drawing Sheet

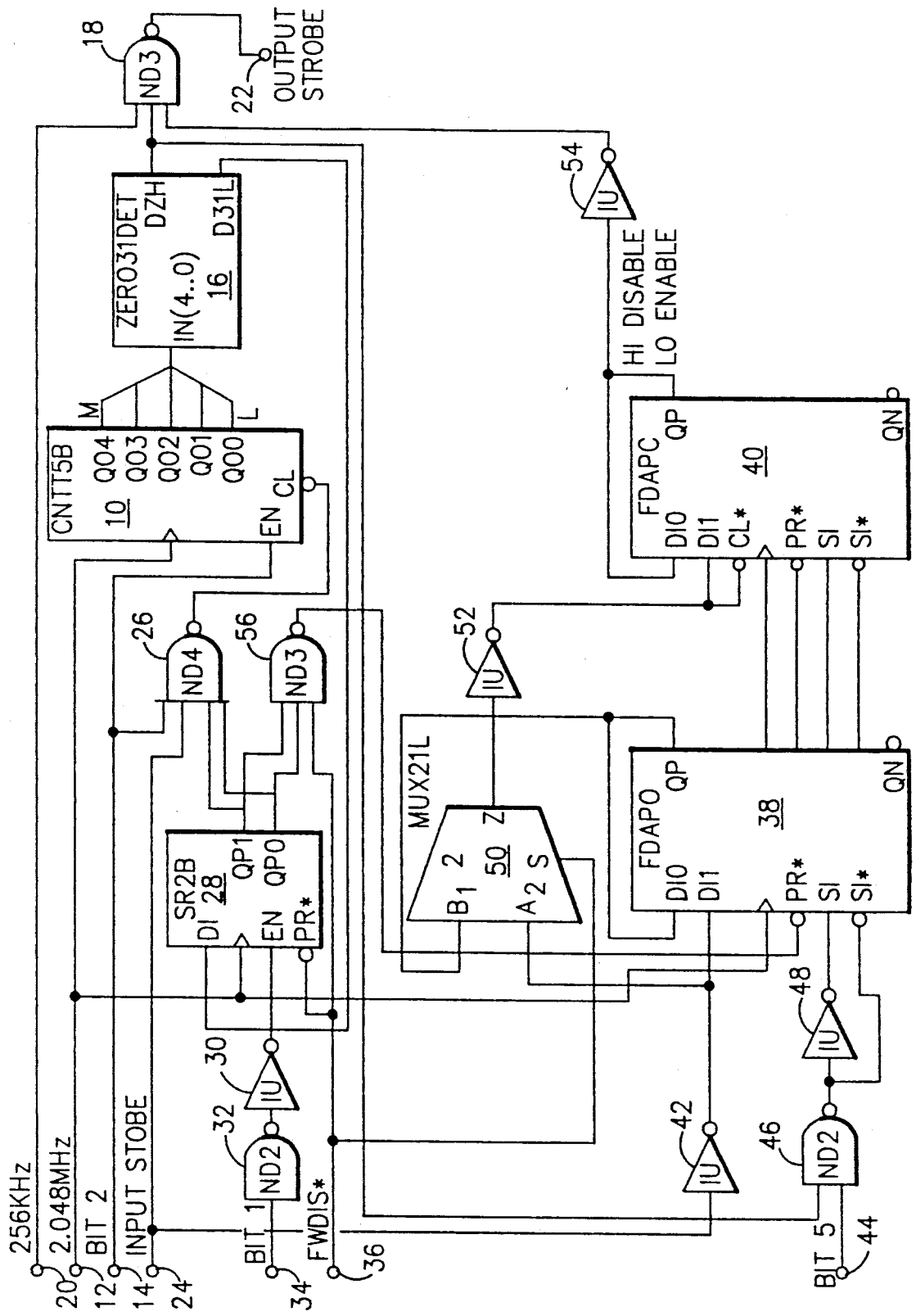

FLYWHEEL CIRCUIT

CROSS-REFERENCE TO RELATED APPLICATIONS

This application is related to a co-pending application Ser. No. 07/451,436, now U.S. Pat. No. 4,993,019.

BACKGROUND OF THE INVENTION

1. Field of the Invention

The present invention relates to systems that provide signals that occur in an assigned time slot of a multi-time slot repetitive frame, the assigned time slot being determined by input data and, more particularly, to a circuit for reducing the chance of an error in the data from causing the signal to be provided in an incorrect time slot.

2. Description of the Prior Art

In many situations where pulse code modulation (PCM) is used in conjunction with time division multiplexing (TDM), a signal is provided in an assigned time slot of a multi-time slot repetitive frame, with the assignment of the time slot being determined by input data. Errors occurring in the input data could result in the signal being provided in an erroneous time slot. Errors in transmitted data are often intermittent perturbations or spurious signals which are only of a short duration and quickly disappear. However, such data errors could result in significant system failure by the signal being provided in a wrong time slot.

There are frequently situations where timing strobes are generated in an assigned time slot, and the strobes may be transmitted over a bus that may be subject to interference. Such interference could cause a strobe to be temporarily lost or could cause extra strobes. In either event, the system responsive to the strobe would be adversely affected.

In most cases, the signals are generated in response to a strobe, the timing of which is determined by the input data. Thus, the problem can be distilled down to a situation where a strobe is to be repeatedly generated in the same time slot of a frame with the time slot changing only occasionally in response to changed input data; however, disturbances can result in the temporary generation of strobes in improper time slots. The prior art did not provide a way to reduce the chance of the disturbances causing strobes to be provided in the wrong time slot.

SUMMARY OF THE INVENTION

The present invention contemplates a circuit incorporating the principle of inertia for reducing the chance of errors in input data or received strobes resulting in a signal or strobe being provided in an erroneous time slot. Since most data errors in these types of devices are intermittent and non-repetitive, it is desirable to provide the system with an inertia so that the output of the system does not immediately respond to changes in the input data. In such a case, a temporary absence of input data or a strobe would not immediately stop the generation of output signals or output strobes, nor would the output change immediately in response to an input data change or an extra strobe. Such an inertia would allow the system to remain in its existing state during periods of intermittent or spurious input changes.

In the following discussion, input strobe will mean a received strobe or a strobe generated from input data, and output strobe shall mean a transmitted strobe or a signal generated by a strobe.

In the present invention, inertia is provided by a flywheel circuit that is used to prevent errors in an input strobe from causing the system to generate an output strobe in an incorrect time slot. The flywheel circuit is centered around a counter that repetitively counts up to the number of time slots in a frame. The counter is synchronized to the time slot in which the input strobe is provided, so that the counter output goes to zero during the assigned time slot. The zero output of the counter is used to generate the strobe output.

A two-bit shift register receives at a data input a signal derived from the counter output, said signal being 0 when the counter output is at the counter's highest number, which is one time slot before a zero counter output. An enable input of the shift register receives an enabling signal when an input strobe is present. If the counter is synchronized with the time slot of the input strobe, a 0 is entered into the two-bit shift register each frame. If the counter is not synchronized to the time slot of the input strobe, a 1 is entered into the two-bit shift register each frame. When the shift register has two 1s entered, it initiates action to re-synchronize the counter to the time slot of the input strobe.

Thus, the flywheel circuit effectively ignores one erroneous input strobe, but after two erroneous input strobes it is recognized that the time slot assignment may have changed and an attempt is made to re-synchronize the counter by resetting the counter to zero during the time slot in which the input strobe is received. However, during the re-synchronization operation, the output strobe is disabled and remains disabled until two input strobes are received in the same time slot.

Logic circuitry responds to a flywheel disable signal to disable the flywheel circuit to allow for the generation of output strobes in multiple time slots in one frame.

A primary objective of the present invention is to provide an output strobe in a time slot that is synchronized with a time slot of an input strobe that occurs in one time slot of a frame, as determined by time slot assignment data and to provide a delay in responding to assignment data or input strobe changes.

Another objective of the present invention is to provide a circuit that requires two input strobes to occur in the same time slot of two consecutive frames before a re-synchronized output strobe is enabled.

Another objective of the present invention is to provide a flywheel circuit which will continue to provide an output strobe in an assigned time slot, even if an input strobe does not appear for one frame.

Another objective of the present invention is to disable the output strobe if the input strobe stops for two or more frames.

Another objective of the present invention is to provide a flywheel circuit which will disable the output strobe in the event that more than two input strobes occur in one frame.

DESCRIPTION OF THE DRAWING

The drawing provides a schematic diagram of the present invention.

DETAILED DESCRIPTION OF THE PREFERRED EMBODIMENT

Referring to the figure, there is shown a schematic diagram for a flywheel circuit. The circuit is particularly adapted for a system having frames with a duration of 125 us, each frame having 32 time slots numbered from 0-31, with each time slot including eight bits of data. The time slots have a frequency of 256 KHz, while the bit rate is 2.048 MHz. It is to be understood that these parameters illustrate only one environment in which the present invention may function and by no means restrict the scope of the invention.

The flywheel circuit is centered around a five-bit counter 10 which receives a 2.048 MHz clock signal from a terminal 12. The enable input of the counter 10 is connected to a terminal 14 which receives a strobe signal upon the occurrence of a second bit of each time slot. Thus, the counter is incremented during the second bit of each time slot and repeatedly counts from 0 to 31, providing five parallel outputs to a detector 16, which includes logic to provide a DZH output at a 1 level when the counter output is zero, and provides a D31L output at the 0 level when the counter output is 31. The DZH output is connected to an input of a NAND gate 18, which also receives an input from a terminal 20 which is connected to a 256 KHz clock signal. The 256 KHz clock has a one-eighth duty cycle and goes high or to the 1 level only during the last bit of a time slot or during bit time 8. The output of NAND gate 18 is connected to a terminal 22 which provides the output strobe at bit time 8.

When the counter is running, an output strobe is provided in each frame during the time slot in which the counter output goes to zero.

The counter may be synchronized to the time slot of an input strobe received at a terminal 24. The input strobe is generated by an associated system during a time slot in accordance with the assignment data inputted to the system. Terminal 24 is connected to an input of a NAND gate 26 which has another input connected to terminal 14 for receiving the bit time 2 strobe. NAND gate 26 has an output connected to a clear input of counter 10.

A two-bit shift register 28 functions as a strobe timing comparator and in conjunction with gate 26 as a clock resynchronizer. Register 28 has a data input, DI, connected to the D31L output of detector 16. A clock input is connected to terminal 12 for receiving the 2.048 MHz clock. An enable input, EN, of register 28 is connected to an output of an inverter 30 which has an input connected to an output of a NAND gate 32. Gate 32 has one input connected to terminal 24 for receiving the input strobe, and a second input connected to a terminal 34 which receives a strobe during the first bit of each time slot. Register 28 also has a preset input, PR*, connected to a terminal 36 which receives a flywheel disable signal, FWDIS*. Register 28 also has two outputs QP0 and QP1.

During bit time 1 of a time slot in which there is an input strobe, register 28 is enabled. If the counter 10 is in sync with the time slot of the input strobe, the counter will, during bit time 1 of the time slot, still be outputting a count of 31, since it is incremented at bit time 2. Thus, during bit time 1, a 0-level signal is provided to the data input, DI, of register 28, resulting in a 0-level signal at output QP0 of the register. If the input strobe appears in a time slot other than the one to which the counter is synchronized, the output from detector 16 on DL31L will not be 0 when register 28 is enabled, and the register will be incremented to provide a 1-level output at QP0. If a second input strobe arrives in a time slot out of sync with the counter, the shift register will again be incremented to provide two 1-level outputs at QP0 and QP1.

Outputs QP0 and QP1 of register 28 are also connected to inputs of NAND gate 26. Thus, when both outputs of register 28 are incremented to 1-level signals during bit time 1, NAND gate 26 will see during bit time 2 all 1-level inputs and the counter will be cleared to provide a 0 output, thereby synchronizing the counter to the time slot in which the input strobe was received.

If an input strobe on terminal 24 appears in a time slot that is not in sync with counter 10, register 28 will register a 1-level signal at output QP0, as mentioned previously. However, if the next input strobe arrives in a time slot that is in sync with counter 10, a 0-level will be received on the data input of the register so that the outputs from the register will be 0 and 1, which will not result in a clearing or a re-synchronization of the counter 10, and the out-of-sync input strobe will essentially be ignored. Thus, the flywheel circuit continues to provide output strobes in the same time slot of each frame, if only one input strobe is missing from the assigned time slot of a frame.

The flywheel disable FWDIS* signal is 0 when the flywheel is to be disabled. The presence of a 0 input on the preset input of register 28 causes both outputs of the register to go a 1 level, which results in the counter being cleared during bit time 2 of the next time slot in which an input strobe is received, thereby setting the counter to zero, which will initiate the generation of an output strobe on terminal 22. As long as the flywheel disable signal is 0, the counter will be reset every time slot when an input strobe appears on terminal 24, and an output strobe will be generated on terminal 22. Thus, the flywheel is disabled, and an output strobe is generated for each input strobe.

If the input strobe on terminal 24 ceases to occur, the register 28 will not be enabled, and the flywheel circuit will continue to generate output signals in the assigned time slot of each frame. Thus, provisions must be made to disable the output if the input strobe ceases for two or more frames. To provide this capability, two 2-input D-type flip-flops 38 and 40 are provided. Flip-flop 38 receives at an input DI1 the input strobe through an inverter 42. Select inputs SI and SI* are provided with inputs sensitive to a DZH signal from detector 16, and to a bit time 5 strobe appearing on a terminal 44. A NAND gate 46 receives the DZH signal and the bit time 5 strobe so that the DZH signal is sensed after the counter 10 has been incremented at bit time 2. An output of gate 46 is connected to an input of an inverter 48, with an output of inverter 48 being connected to the SI input of flip-flop 38 and the output of gate 46 being connected to the SI* input of flip-flop 38. Thus, during bit time 5 when the counter is at zero, the input strobe will be entered into the flip-flop at DI1 as a 0-level signal. When bit time 5 ends, the selected input of the flip-flop 38 switches to DI0, since the signals at the select inputs will reverse after bit time 5. The DI0 input of flip-flop 38 is connected to the QP output, thus maintaining the output of flip-flop 38 at a 0 level. If the input strobe is not present during bit time 5 in a time slot when the DZH signal is 1, a 1-level signal will be entered into the DI1 input of flip-flop 38, generating a 1-level signal at the output QP, which will be maintained after the signals to the select inputs reverse polarity at the termination of the bit time 5 strobe, or when the DZH signal goes to 0.

The output QP of flip-flop 38 is connected to an input of a multiplexer 50, which input would normally be fed to a multiplexer output and to an inverter 52, an output of which is connected to the DI1 and clear inputs of flip-flop 40. Inverter 52 is necessary, since the output of the multiplexer 50 is inverted. If the output of flip-flop 38 is 0, this will appear as 0 at the DI1 and clear inputs of flip-flop 40, resulting in 0-level signals at an output QP of flip-flop 40, since the presence of a 0 at the clear input immediately clears the flip-flop and puts a 0 on output QP. The input select inputs of flip-flop 40 are connected to the input select inputs of flip-flop 38; therefore, the inputs will switch simultaneously with the inputs of flip-flop 38, and the 0-level signal at the output will be maintained as it is fed back to the DI0 input.

The QP output of flip-flop 40 is connected to an inverter 54, the output of which is connected as a third input to NAND gate 18. A 1-level at the QP output of flip-flop 40 will result in disabling the output on terminal 22, while a low signal on output QP of flip-flop 40 will enable the output.

If an input strobe is missing when DZH of detector 16 is at a 1 level, and during bit time 5, and flip-flop 38 is set to the 1 state, this appears at the DI1 input of flip-flop 40 and would be ready to be clocked in at the next frame, when the flip-flop input is switched from DI0 to DI1 during bit time 5, when DZH is at a 1 level. If, in the next frame, the input strobe is still missing, the output of flip-flop 38 will remain 1, and the output of flip-flop 40 will change to a 1-level, resulting in the disabling of output 22. If perchance the input strobe returned to its proper time slot, flip-flop 38 would receive a 0-level input and provide a 0-level output, while flip-flop 40 would clock in a 1-level signal during bit time 5. However, immediately thereafter the clear input of flip-flop 40 would receive the 0-level output from flip-flop 38, so that by bit time 7, flip-flip 40 would be cleared to provide a 0-level output, thereby enabling the output strobe at terminal 22. Thus, flip-flops 38 and 40 function to disable the output if the input strobe is missing for two consecutive frames or more.

A select input of multiplexer 50 is connected to the flywheel disable signal, FWDIS*, at terminal 36, so that when the flywheel disable signal is 0 the multiplexer 50 receives its input from the output of inverter 42, to essentially bypass flip-flop 38. Flip-flop 40 will continue to function and provide an output level 1, if the input strobe does not occur when DZH is at a 1 level during bit time 5, to thereby disable the output. Thus, a FWDIS* 0-level signal disables the flywheel so that an output strobe is produced for each input strobe. However, flip-flop 40 functions to disable the output strobe if there is no input strobe. This could happen by the cycling of counter 10 back to zero as a result of its normal counting, and not as a result of clearing by an input strobe.

A NAND gate 56 is connected to receive the two outputs of register 28 and the flywheel disable signal, to provide a 0-level output only when the flywheel is not being disabled and when the counter is being re-synchronized as the result of the presence of two 1-level signals at the outputs of register 28. The output of NAND gate 56 is connected to the preset inputs of both flip-flops 38 and 40 to effectively drive the outputs to a 1-level when NAND gate 56 goes to a 0 level. Thus, when the flywheel disable signal is at a 1 level, indicating that the flywheel is not disabled, and shift register 28 indicates that the counter 10 should be re-synchronized, NAND gate 56 functions to cause the output to be disabled until the counter is properly synchronized with the input strobe which can result when the input strobe appears in the same time slot for two consecutive frames. During a first frame, re-synchronization is attempted during bit time 2, during the second frame there should be synchronization, and register 28 should enter a 0-level input at bit time 1. Gate 56 will then no longer see all 1s, and the disable signal will be removed.

Thus, the output of NAND gate 18, which is the output of the flywheel circuit, is synchronized to the time slot of an input strobe received on terminal 24, so that the output and input strobes both occur in one assigned time slot of each frame. If the input strobe stops for one frame, the flywheel circuit will continue to provide an output strobe on terminal 22; however, if the input strobe stops for two frames, the output strobe will be disabled because both flip-flops 38 and 40 will register a 1-level signal. If the input strobe occurs in a time slot that is not in sync with the counter, the shift register 28 will provide a 1-level output on a single output terminal. If the time slot of a second input strobe is in sync with counter 10, the shift register 28 still provides a 1 and a 0 output, and nothing happens; however, if a second input strobe occurs in a time slot out of sync with counter 10, shift register 28 provides two 1-level outputs, and the counter is cleared and re-synchronization is attempted. In the meantime, the presence of two 1-level signals at the outputs of shift register 28 cause NAND gate 56 to provide a 0-level signal and flip-flops 38 and 40 to provide 1-level outputs, thereby disabling the flywheel circuit output. However, if in the next frame the counter is properly synchronized with the time slot of the input strobe, a 0-level signal will be entered into shift register 28, which will cause output QP0 to go to 0, thereby removing the 0-level at the preset inputs of flip-flops 38 and 40, and allowing the flip-flops to go to a 0-level at the next simultaneous occurrence of a 1-level on the DZH output of detector 16, a bit time 5 strobe and an input strobe. Thus, the input strobe must be in the same time slot for two frames before the counter is fully synchronized and signals are provided at output terminal 22.

Thus, the present invention satisfies all of the objectives set forth in the Summary of the Invention and provides a flywheel circuit that will reduce the chance of errors occurring in input data or input strobes from producing output signals or output strobes in an incorrect time slot.

The counter described in the present invention was selected to be a five-bit counter to correspond to a frame having 32 time slots; however, it is to be understood that any other frame length could be used with an appropriate-sized counter. A two-bit register was used to require the input strobe to be in an incorrect time slot for two frames before re-synchronization is initiated; however, a greater number of frames could be selected by merely using a shift register having a greater length. Two flip-flops were used to detect the absence of input strobes for two frames before the output is disabled. A greater number of flip-flops could be used to further delay the disable function.

Thus, the present invention uses the concept of inertia by employing a flywheel circuit to delay reaction to a changed input.

What is claimed is:

1. A flywheel circuit for use in a system that provides an output signal that occurs in an assigned time slot of a multi-time slot repetitive frame, the assigned time slot being determined by input data to said system, said flywheel circuit comprising:

means for generating said output signal during the assigned time slot in each frame;

means for receiving an input signal from said system during a time slot determined by said input data; and means for comparing the timing of the output signal with the timing of the input signal and for initiating synchronization of the generating means with the input signal, when the relative timing does not correspond in a predetermined manner for a predetermined number, greater than one, of consecutive frames.

2. A flywheel circuit as described in claim 1, wherein the means for generating said output signal comprises:

a counter for cyclically counting from 0 to the number of time slots in a frame; and means responsive to a counter output for providing said output signal each time the counter is at a predetermined count.

3. A flywheel circuit as described in claim 1, additionally comprising:

input means for receiving a flywheel circuit disable signal; and means for providing the flywheel circuit disable signal to the comparing means, the comparing means being responsive to the flywheel circuit disable signal to initiate synchronization of the generating means each time an input signal is received, whereby an output signal is generated for each input signal without regard to the number of input signals received in each frame.

4. A flywheel circuit as described in claim 3, additionally comprising means enabled by the output signal to receive the input signal and, in the absence of the input signal when enabled, for blocking the output signal.

5. A flywheel circuit as described in claim 1, wherein the output signal is an output strobe and the input signal is an input strobe.

6. A flywheel circuit as described in claim 5, wherein the means for comparing provides a disable output signal when the timing of the input strobe and output strobe do not correspond in the predetermined manner for the predetermined number of consecutive frames, said flywheel circuit additionally comprising means responsive to the disable output signal for blocking the output strobe from the generating means.

7. A flywheel circuit as described in claim 6, wherein the comparing means removes the disable output signal when the timing of the input strobe and the output strobe correspond in the predetermined manner for a second predetermined number of consecutive frames.

8. A flywheel circuit as described in claim 6, wherein the blocking neons blocks the output strobe if more than a predetermined number of input strobes occur in one frame.

9. A flywheel circuit as described in claim 5, additionally comprising means for blocking the output strobe when the input strobe is absent for more than the predetermined number of consecutive frames.

10. A flywheel circuit as described in claim 9, wherein the means for blocking comprises first and second serially connected flip-flops, each enabled by the output strobe, the first flip-flop having an input for receiving a signal corresponding to the presence or absence of an input strobe, so that when two consecutive absences of the input strobe are sensed during the occurrence of the output strobe, a blocking signal is provided by an output of the second flip-flop and the output strobe is blocked.

11. A flywheel circuit as described in claim 10, wherein an output of the first flip-flop is connected to an input of the second flip-flop and a clear input of the second flip-flop, said clear input being responsive to a predetermined state, so that if the first flip-flop senses the presence of the input strobe while enabled, the output of the first flip-flop will immediately initiate a clearing of the second flip-flop to prevent the generation of a blocking signal.

12. A flywheel circuit as described in claim 5, wherein the means for comparing comprises a shift register having a bit capacity and outputs equal in number to said predetermined number of consecutive frames, said shift register having an input, receiving a signal corresponding to the state of the output strobe, and an enable input receiving a signal corresponding to the state of the input strobe to clock in one bit each frame corresponding to the state of the output strobe when enabled by the input strobe, so that when all of the outputs are at a predetermined state indicating a lack of timing correspondence in the predetermined manner for the predetermined number of consecutive frames, synchronization of the generating means is initiated.

13. A flywheel circuit as described in claim 12, wherein the means for generating comprises a counter for cyclically counting from 0 to the number of time slots in a frame and for providing said output strobe each time the counter is at a predetermined number, said circuit additionally comprising means for providing a reset signal when all of the outputs of the shift register are at the same predetermined state, said reset signal being provided to an input of the counter to reset the counter to the predetermined number and initiate synchronization.

14. A flywheel circuit as described in claim 12, wherein the means for comparing provides a disable output signal when the timing of the input strobe and output strobe do not correspond in the predetermined manner for the predetermined number of consecutive frames, said flywheel circuit additionally comprising means responsive to the disable output signal for blocking the output strobe from the generating means.

15. A flywheel circuit as described in claim 14, wherein the blocking means comprises a first gate means for providing a first output when all of the outputs of said shift register are at the same predetermined state, and a second gate means receiving the output signal from the means for generating, and the first output signal from the first gate means, whereby the output of the means for generating is not passed through the second gate means when the first output is at a predetermined state.

16. A flywheel circuit as described in claim 5, additionally comprising:

input neons for receiving a flywheel circuit disable signal; and means for providing the flywheel disable signal to the comparing means, the comparing means being responsive to the flywheel circuit disable signal to initiate synchronization of the generating means each time an input strobe is received, whereby an output strobe is generated for each input strobe without regard to the number of input strobes received in each frame.

17. A flywheel circuit as described in claim 16, additional comprising means enabled by the output strobe to receive the input strobe and, in the absence of the input strobe when enabled, for blocking the output strobe.

* * * * *

UNITED STATES PATENT AND TRADEMARK OFFICE
CERTIFICATE OF CORRECTION

PATENT NO. : 5,058,106

DATED : October 15, 1991

INVENTOR(S) : Gary B. Cole

It is certified that error appears in the above-identified patent and that said Letters Patent is hereby corrected as shown below:

At column 7, line 58, after "blocking", please delete "neons" and insert therefor --means--.

At column 8, line 62, after "input", please delete "neons" and insert therefor --means--.

Signed and Sealed this

Twelfth Day of January, 1993

Attest:

DOUGLAS B. COMER

Attesting Officer

Acting Commissioner of Patents and Trademarks